Nov. 13, 1956     R. E. BROWN     2,770,126
DEVICE FOR MAKING ACCELERATION TESTS ON SMALL OBJECTS
Filed March 2, 1953     2 Sheets-Sheet 1
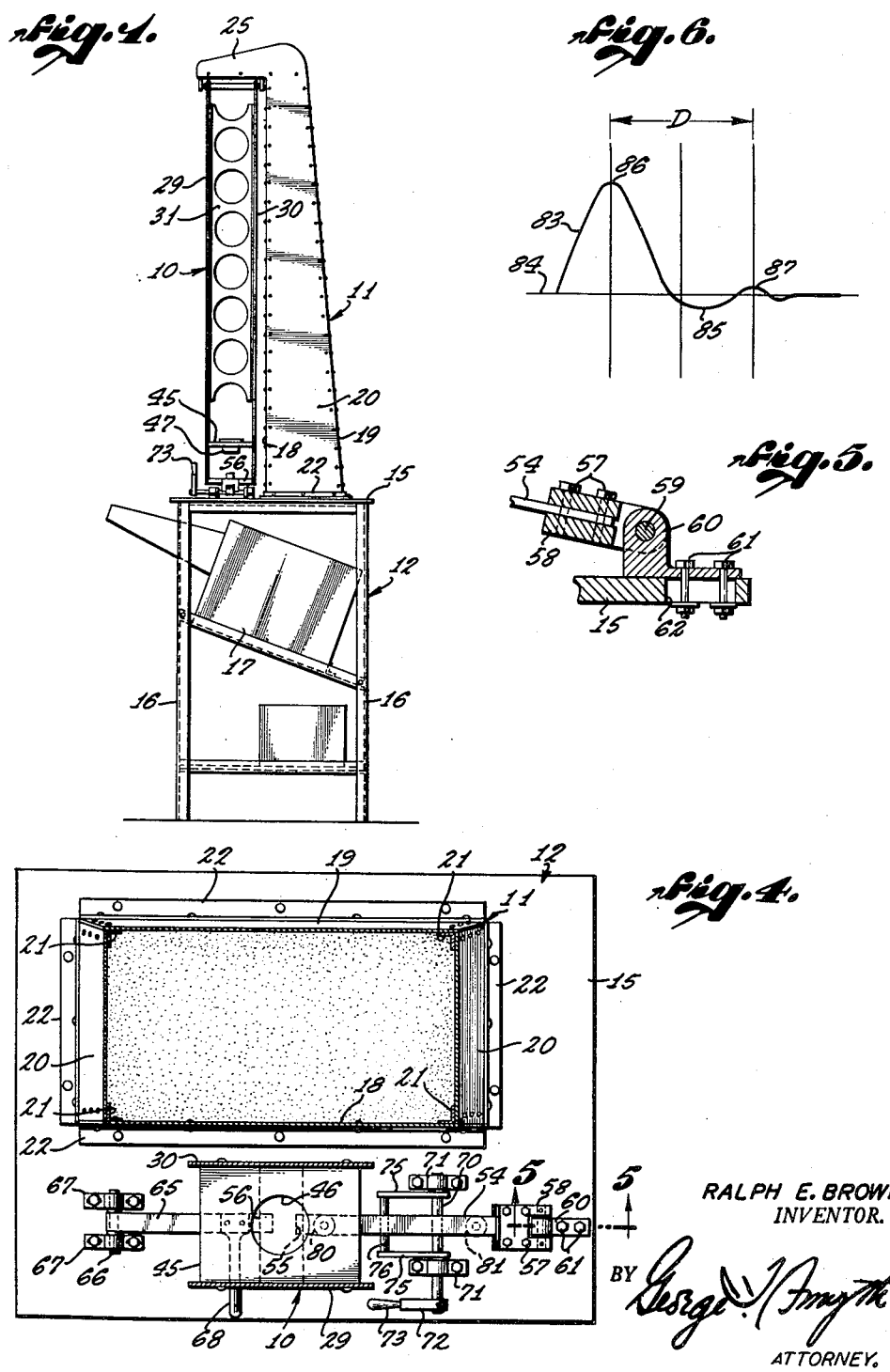
RALPH E. BROWN,
INVENTOR.
BY George N. Smyth
ATTORNEY.

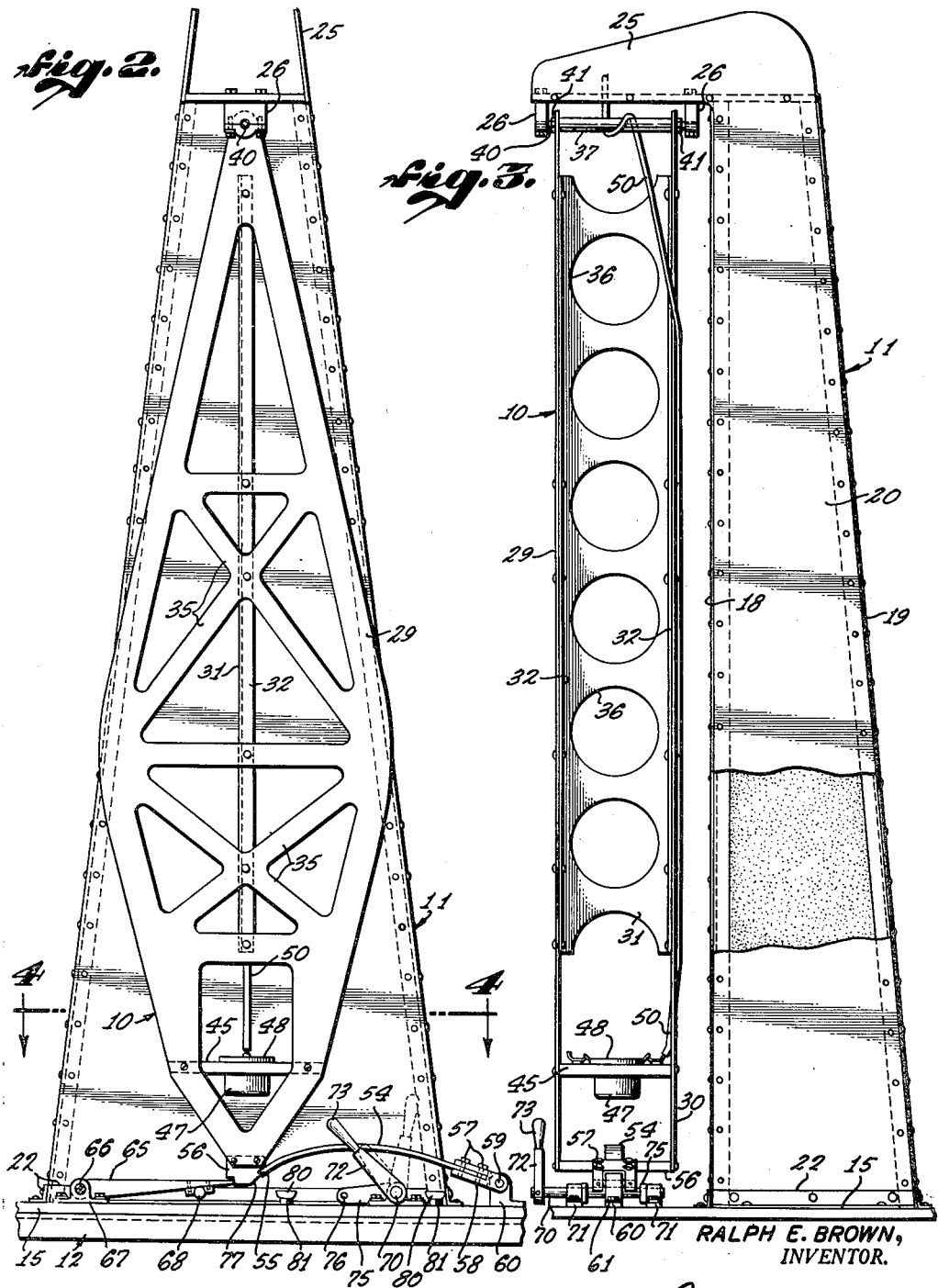

United States Patent Office 2,770,126
Patented Nov. 13, 1956

2,770,126

DEVICE FOR MAKING ACCELERATION TESTS ON SMALL OBJECTS

Ralph E. Brown, Los Angeles, Calif., assignor to Genisco, Inc., Los Angeles, Calif., a corporation Application March 2, 1953, Serial No. 339,842

14 Claims. (Cl. 73—1)

This invention relates to devices for subjecting various objects to acceleration and impact forces for various test purposes. While the invention is broadly applicable for determining and observing the effects of acceleration, it has outstanding advantages for the testing of instruments that indicate or measure acceleration forces and has special utility as applied to the problems involved in testing the damping characteristics of acceleration measuring instruments commonly used on aircraft and the like. This particular application of the invention will be described herein for the purpose of disclosure and will provide adequate guidance for those skilled in the art who may have occasion to apply the same principles to other specific purposes.

Acceleration measuring instruments of this type known as accelerometers are commonly tested to ascertain the responsiveness of the instrument to acceleration and in some instances for calibrating the instrument. It is desirable to provide an acceleration force of known magnitude directed along the axis of maximum sensitivity of the instrument.

There is also a pressing need for means to test the damping characteristics of an accelerometer of the enclosed type. The older open type accelerometer may be tested with reference to damping merely by manually "plucking" the responsive mass of the instrument to displace the mass in one direction from its normal static position and then observing or measuring the overshoot of the travel of the mass on the opposite side of its normal static position. Since the mechanism of a sealed type accelerometer, however, is not accessible for this simple test procedure some means is required that will bodily accelerate the instrument in a predetermined manner to displace the responsive mass and that will provide an immediately subsequent period in which the responsive mass will be sufficiently free from any further forces to permit the damping function to be carried out in an unimpeded and uninfluenced manner.

From the foregoing, it is apparent that one problem is to provide a test apparatus of this character that will produce the required acceleration force but will avoid the simultaneous application of troublesome extraneous forces and effects. The ideal is a single unidirectional acceleration force along the sensitive axis of the instrument. Numerous forces in different directions, however, and various reactions effects are necessarily involved in the operation of any test apparatus having moving parts and the problem is to accelerate the instrument without creating obscuring effects.

The problem of providing an immediately subsequent second stage in which the accelerated instrument moves freely without interference with its damping function, would require, theoretically, permitting the accelerated instrument to move unencumbered in free space. Such a solution is not practical, obviously, for a number of reasons. A feature of the present invention, however, is that it provides for a post-acceleration test stage that approaches the free falling state of the instrument with close enough approximation to reveal accurately the manner in which the damping function of the instrument is performed.

Broadly described, the invention attains its purpose by providing a suitable pendulum structure to support an instrument under test. The pendulum is suitably rigid to minimize vibration and oscillation effects, has a minimum equivalent flat plate area to minimize air resistance, is mounted on suitable bearing means to minimize pivotal resistance, and, finally, is supported by a sufficiently rigid or massive base structure to insure stabilization of the pivot axis.

The instrument to be tested is mounted on the pendulum with the sensitive axis of the instrument in the plane of oscillation of the pendulum and positioned substantially tangential to the arcuate path of reciprocation of the instrument. Abrupt acceleration force is then applied to the pendulum in its plane of oscillation to place the pendulum in free swinging state. Gravity and inertia forces cancel out along the tangential sensitive axis of the instrument in the free-swinging state of the pendulum. The remaining forces involved may be neglected since any errors introduced by deceleration arising from air resistance or bearing friction are minimized and since any cross-coupling effect of the centrifugal force component will be of insignificant magnitude. Thus the free-swinging state of the pendulum so closely simulates a free falling state for the instrument, that the damping function of the instrument is practically uninfluenced and may be accurately determined by suitable indicating means. A feature of the preferred practice of the invention is the use of an oscilloscope for this purpose.

In various practices of the invention, various force-applying means, including impact means as well as thrust means, may be employed to accelerate the pendulum. A feature of the preferred embodiment of the invention, however, is the use of a leaf spring bowed under longitudinal compression to exert end thrust against the pendulum. In accord with this concept, the pendulum may be immobilized by suitable latch means with the bowed leaf spring thrusting against the pendulum and then the latch means may be tripped to release the pendulum for acceleration by the leaf spring. An important advantage of such an arrangement is that the thrust of the leaf spring is substantially uniform throughout its range of action so that the leaf spring exerts substantially constant acceleration force as it straightens out. A further advantage is that the range of thrust may be varied simply by varying the degree to which the leaf spring is bowed under longitudinal stress.

As will be explained, the preferred practice of the invention has further features including a convenient quickly operable cocking means for stressing the leaf spring as well as an arrangement whereby the leaf spring abruptly breaks contact with the accelerated pendulum and then automatically shifts out of the path of oscillation of the pendulum.

The various features and advantages of the invention may be understood from the following detailed description considered with the accompanying drawings.

In the drawings, which are to be regarded as merely illustrative:

Figure 1 is a side elevation of the presently preferred embodiment of the invention;

Figure 2 is a front elevation on an enlarged scale of a portion of the device that includes the full length of the pendulum;

Figure 3 is a side elevation of the portion of the apparatus shown in Figure 2;

Figure 4 is a transverse section taken as indicated by the line 4—4 of Figure 2;

Figure 5 is a fragmentary section, taken as indicated by the line 5—5 of Figure 4; and Figure 6 shows the general pattern of a typical signal trace on the oscilloscope representing the damping behavior of the instrument under test.

The presently preferred embodiment of the invention illustrated in the drawings comprises a pendulum, generally designated 10, and a suitable support structure for the pendulum which comprises a suitable pedestal 11 mounted on a base structure 12. The base structure 12 may comprise a table top 15 mounted on suitable framework including four legs 16. While any suitable indicating means may be employed to ascertain the behavior of the instrument under test, a feature of the present invention is the mounting of an oscilloscope 17 in the base structure 12 for this purpose. The oscilloscope is tilted as shown for convenient observation by the operator of the test apparatus, the operator being seated in front of the apparatus within convenient reach of the table top 15.

It is contemplated that the pedestal 11 will have a relatively large mass to provide an exceedingly stable support axis for the pendulum. A feature of the invention in this respect is that the pedestal 11 is of hollow construction and is filled with relatively heavy granular material such as sand to provide the required mass, as indicated in Figures 3 and 4.

In the construction shown, the pedestal 11 comprises a front plate 18, a back plate 19 and two side plates 20, which plates are riveted to four concealed angle members 21 at the four corners of the pedestal and are likewise riveted to four base angle members 22, the base angles being in turn riveted to the table top 15. As shown in Figures 1 and 3, the pedestal is formed with an overhanging head portion 25, on the underside of which is mounted a pair of suitable bearings 26 for pivotal support of the pendulum 10. These bearings are preferably of ball bearings or roller bearings to provide minimum resistance to the swinging movement of the pendulum.

The pendulum 10 may be of any suitable construction, but should be of high rigidity and preferably should have a relatively low equivalent flat plate area with respect to the direction of the swinging movement of the pendulum for the sake of minimizing air resistance to the swinging movement. In the construction shown, the pendulum 10 comprises a front plate 29 and a back plate 30 interconnected by a central upright plate 31. The central plate 31 is formed with longitudinal side flanges 32 that are riveted to the two side plates as shown. The two plates 29 and 30 are cut away to the configuration of a frame with diagonal elements 35 to provide high edgewise rigidity with minimum weight. The central plate 31 is also of open construction by virtue of a series of large apertures 36 which serve to minimize air resistance.

At the upper end of the pendulum 10, the front and rear plates 29 and 30 are interconnected by a tubular member 37. A pivot shaft 40 extends through the tubular member 37 and is secured thereto by nuts 41. The two ends of the pivot shaft 40 are of reduced diameter and are journaled by the previously mentioned pair of bearings 26.

A test platform 45 may be mounted in the pendulum 10 near its lower end and adapted for releasable engagement by an instrument to be tested. For this purpose, the test platform 45 may have a central aperture 46, as shown in Figure 4, to serve as a seat for a circular instrument. Figure 2 shows an accelerometer 47 seated in the aperture 46 with the rim flange 48 of the accelerometer in supporting contact with the upper surface of the test platform. The accelerometer under test is electrically connected with the oscilloscope 17 by means of conductors in a suitable cable 50, which, as shown in Figure 3, extends up the pendulum 10 and is looped around the tubular cross-member 37 for flexible connection with the pedestal 11, the cable extending down the pedestal to the oscilloscope.

Any suitable means may be employed to strike or thrust against the pendulum 10 to accelerate the pendulum to permit observation of the behavior of the instrument on the pendulum as revealed by the oscilloscope 17. In some instances a weight, hammer or other impact means may be utilized for this purpose. A feature of the present embodiment of the invention, however, is the use of a suitable leaf spring 54 for endwise thrust against the pendulum.

In the particular arrangement shown in the drawing by way of example, one end of the leaf spring 54 is adapted to seat against a shoulder 55 that is formed in a cross bar 56 at the bottom of the pendulum. The other end of the leaf spring may be pivotally mounted and for this purpose may be attached by screws 57 to a hinge leaf 58, which leaf is pivotally mounted by a pin 59 on a suitable bracket 60. Preferably the bracket 60 is adjustable towards and away from the static position of the pendulum and for this purpose may be releasably secured by suitable bolts 61 to the table top 15, the bolts extending through a slot 62 of sufficient length to provide the required range of adjustment.

In the present practice of the invention it is contemplated that suitable latch means will be provided to hold the pendulum 10 stationary with the leaf spring bowed as shown in Figure 2, so that it is merely necessary to release the latch means to cause the pendulum to be accelerated by the leaf spring. As best shown in Figures 2 and 5, the latch means may comprise a latch arm 65 that is pivotally mounted on the table top 15 by a cross pin 66 journaled in a pair of spaced bearings 67. For convenience the latch arm 65 may be provided with a suitable handle 68 within easy reach of the seated operator.

If desired suitable means may be provided to "cock" or bow the leaf spring 54 while the pendulum is immobilized by the latch arm 65. For this purpose, the present embodiment of the invention includes a short shaft 70 journaled in a pair of bearings 71 and carrying an operating lever 72 with a suitable handle 73. A pair of arms 75 mounted on the shaft 70 are interconnected by a cross rod 76 positioned to swing upward in an arc against the underside of the leaf spring 54. With the pendulum 10 engaged by the latch arm 65, clockwise rotation of the lever 72, as viewed in Figure 2, bows the leaf spring 54 upward and draws the outer end of the leaf spring against the bottom of the pendulum with a wiping action until the leaf spring snaps into engagement with the shoulder 55 on the pendulum cross bar 56. Preferably the cross bar 56 is cut away to provide an upwardly inclined surface 77 leading to the shoulder 55 to facilitate the sliding movement of the leaf spring into the engaged position.

A further feature of this embodiment is the provision of two spaced suction cups 80 of rubber, or the like, mounted on small base blocks 81 on the table top 15 under the leaf spring 54. The suction cups serve both to cushion the downward movement of the released leaf spring and to effect vacuum engagement with the leaf spring for the prevention of rebound.

The operation of the described test apparatus may be readily understood from the foregoing description. In preparation for a test, an accelerometer 47 is securely mounted on the platform 45 and connected with the cable 50 for communication with the oscilloscope 17. The operator then cocks the leaf spring 54 by the simple procedure of first lifting the handle 68 to bring the latch lever 65 into engagement with the pendulum and then swinging the cocking lever 72 upward to bow the leaf spring 54 progressively until the end of the leaf spring snaps into engagement with the shoulder 55. The operator then pushes downward on the handle 68 to disengage the latch lever 65 and observes the screen of the oscilloscope 17 to study the generated signal as the leaf spring straightens out to accelerate the pendulum. The leaf spring 54 in straightening out with a snap action exerts continuous thrust on the pendulum, but being pivotally anchored is prevented from following the pendulum and therefore abruptly breaks off contact with the pendulum. In straightening out the leaf spring 54 develops a downward component of momentum which swings the leaf spring downward out of the path of oscillation of the pendulum and this downward movement is cushioned by impact of the leaf spring against the two suction cups 80. Gravity also helps the leaf spring to swing downward. Thus the leaf spring is biased both by momentum and gravity to move out of the path of the pendulum, such inherent biasing is preferably to biasing by means of additional spring means. The suction cups provide at least momentary suction engagement with the leaf spring, which engagement together with the cushioning effect of the vacuum cups, prevents rebound of the leaf spring back into the path of the pendulum.

Figure 6 shows the general character of a signal traced on the oscilloscope by a properly damped accelerometer. The leading slope 83 of the curve represents the period of acceleration by the leaf spring 54 and terminates to form the initial major peak at the moment the leaf spring breaks contact with pendulum. In the free swinging period of the pendulum that follows, the responsive mass of the accelerometer moves back towards its neutral or zero position represented by the base line 84 and then overshoots to trace the negative peak 85 which has only a fraction of the magnitude of the initial major positive peak 86, and which is followed by a still smaller second positive peak 87. The curve in Figure 6 represents an acceptable damping behavior in which the distance D between the two successive positive peaks 86 and 87 represents a time interval of approximately $\frac{1}{16}$ second.

This embodiment of the invention will apply accelerations up to approximately 15 G magnitude with the acceleration extending smoothly over a time interval of $\frac{1}{64}$ second or less and with the thrust of the leaf spring against the pendulum ceasing abruptly without transferring any after effects to the pendulum. The rigidity of both the pendulum and the structure that supports the pendulum, together with the open construction of the pendulum to minimize air resistance and the use of antifriction bearings for the pendulum minimizes the forces and reaction effects occurring before and during the free swinging state of the pendulum so that the curve shown in Figure 6 may be relied upon as accurately representing the damping characteristics of the accelerometer on the test platform 45.

An outstanding advantage of the use of a bowed leaf spring in the described manner is that the leaf spring exerts substantially constant force over a considerable range of different degrees of longitudinal compression and thus, as it straightens out, exerts substantially constant thrusts against the pendulum. The effect of changing the position of the bracket 60 along the slot 62 is to vary the extent to which the leaf spring is bowed in its cocked position, thus varying the time duration of the substantially constant thrust exerted by the leaf spring in its accelerating action. The special value of this thrust characteristic is that it minimizes the initial shock of accelerating the pendulum and tends to prevent the responsive mass of the instrument from prematurely falling into its resonant frequency before acceleration ceases.

My description in specific detail of a preferred embodiment of the invention to exemplify the principles involved will suggest to those skilled in the art various changes, substitutions and other departures from my disclosure that properly lie within the spirit and scope of the appended claims.

I claim:

1. In a test device for applying acceleration to an instrument such as an accelerometer, the combination of: a pendulum; a support structure; means pivotally mounting said pendulum on said support structure for free oscillation of the pendulum about a single axis; means to mount the instrument of said pendulum in a position fixed relative to the pendulum; means to apply force to the pendulum to cause acceleration of the pendulum followed by a period of free oscillation of the pendulum in simulation of a free falling state; and indicator means to indicate the response of the instrument on the pendulum to the acceleration of the pendulum and to indicate the reaction of the instrument fduring the subsequent period of free oscillation.

2. A test device as set forth in claim 1 in which said pendulum comprises a highly rigid frame having openings therethrough in its direction of oscillation to provide a low equivalent flat plate area.

3. A test device as set forth in claim 1 in which said support structure has a mass several times the mass of the pendulum for low acceleration reaction effects on the free swinging state of the pendulum.

4. A test device as set forth in claim 1 in which said support structure is of hollow construction filled with heavy granular material.

5. A test device as set forth in claim 1 in which said indicator means comprises an oscilloscope apart from the pendulum adapted for electrical connection with the instrument thereon.

6. A test device as set forth in claim 1 in which said force-applying means is positioned to extend into the path of oscillation of the pendulum, is adapted for releasable engagement with the pendulum thereby to disengage from the pendulum after the acceleration force is applied, and is biased to move out of said path when disengaged from the pendulum thereby to avoid interference with the free-swinging state of the pendulum.

7. A test device as set forth in claim 6 in which said force-applying means is adapted to press against the pendulum, is pivotally mounted for anchorage, and is biased to swing out of the path of the pendulum as soon as the oscillation force is transmitted thereto.

8. In a test device for applying acceleration to an instrument such as an accelerometer, the combination of: a support structure a pendulum mounted on said support structure for oscillation about a single horizontal axis, said pendulum being adapted to support said instrument in a position with the sensitive axis of the instrument in the plane of oscillation of the pendulum; yielding means adjacent the pendulum adapted to be stressed to exert pressure against the pendulum in its plane of oscillation at a starting position of the pendulum; and latch means to immobilize the pendulum in its starting position in opposition to said yielding means whereby disengagement of the latch means releases the pendulum for acceleration by the yielding means.

9. A test device as set forth in claim 8 in which said yielding means is pivotally anchored and is biased to move out of the path of oscillation of the pendulum when disengaged from the pendulum.

10. A test device as set forth in claim 9 in which said yielding means is a leaf spring positioned to be bowed for endwise pressure against the pendulum and positioned to gravitate out of the path of oscillation of the pendulum when disengaged from the pendulum.

11. In a test device for applying acceleration to an instrument such as an accelerometer, the combination of: a pendulum adapted to support said instrument; a leaf spring pivotally mounted to engage the lower end of the pendulum and to swing out of the path of oscillation of the pendulum, said leaf spring being adapted to be bowed upward for endwise thrust against the pendulum, whereby acceleration of the pendulum by the leaf spring results in a downward component of momentum to throw the leaf spring out of the path of the accelerated pendulum; and latch means to releasably maintain said leaf spring in said upwardly bowed position.

12. A test device as set forth in claim 11 which includes means to block the downward movement of the leaf spring and to prevent rebound of the leaf spring back into the path of oscillation of the pendulum.

13. A test device as set forth in claim 12 in which said blocking and preventing means comprises at least one rubber suction cup.

14. A test device as set forth in claim 11 in which said latch means is engageable with said pendulum to hold the pendulum stationary in opposition to said leaf spring and which includes manually operable cocking means to bow said leaf spring into engagement with the pendulum while the pendulum is engaged by said latch means.

References Cited in the file of this patent

UNITED STATES PATENTS

| | | |
|---|---|---|
| 216,590 | Wright | June 17, 1879 |
| 1,834,395 | Gavlak | Dec. 1, 1931 |
| 2,498,844 | Sears et al. | Feb. 28, 1950 |
| 2,518,350 | McCormick | Aug. 8, 1950 |
| 2,539,418 | Grogan | Jan. 30, 1951 |
| 2,630,704 | Armstrong | Mar. 10, 1953 |
| 2,689,938 | Larson | Sept. 21, 1954 |

FOREIGN PATENTS

| | | |
|---|---|---|
| 543,423 | Great Britain | Feb. 25, 1942 |